United States Patent
Savini et al.

(10) Patent No.: US 12,354,058 B2
(45) Date of Patent: Jul. 8, 2025

(54) DEVICE, SYSTEM AND METHOD FOR MANAGING INVENTORY OF PROVIDER OBJECTS

(71) Applicant: AMADEUS S.A.S., Biot (FR)

(72) Inventors: Anne Savini, Auribeau-sur-Siagne (FR); Elisa Boccalini, Antibes (FR); Herve Prezet, Mougins (FR); Rodolphe Gregory Alexandre Texier, Vallauris (FR)

(73) Assignee: AMADEUS S.A.S., Biot (FR)

( * ) Notice: Subject to any disclaimer, the term of this patent is extended or adjusted under 35 U.S.C. 154(b) by 122 days.

(21) Appl. No.: 17/885,720

(22) Filed: Aug. 11, 2022

(65) Prior Publication Data

US 2024/0054448 A1 Feb. 15, 2024

(51) Int. Cl.
*G06Q 10/087* (2023.01)
*G06Q 10/02* (2012.01)
*H04L 67/55* (2022.01)

(52) U.S. Cl.
CPC ........... *G06Q 10/087* (2013.01); *G06Q 10/02* (2013.01); *H04L 67/55* (2022.05)

(58) Field of Classification Search
CPC ...... G06Q 10/087; G06Q 10/02; G06Q 30/02; G06Q 40/08; G06Q 30/0207; G06Q 30/0209; G06Q 30/0212; G06Q 30/0214; G06Q 30/0213; G06Q 30/0211; G06Q 30/0208; G06Q 50/12; G06Q 50/14; G06Q 50/10; G06F 3/04842; G06F 3/0482; G06F 3/04817; G06F 3/048
See application file for complete search history.

(56) References Cited

U.S. PATENT DOCUMENTS

| | | | |
|---|---|---|---|
| 7,769,640 B2 | 8/2010 | Klenske | |
| 8,812,620 B2 * | 8/2014 | Reisman | G06Q 10/067 705/26.1 |
| 10,304,077 B1 | 5/2019 | Merz et al. | |
| 11,017,422 B2 | 5/2021 | Smith et al. | |
| 2010/0205018 A1 * | 8/2010 | Vaughan | G06Q 10/087 705/28 |
| 2011/0238497 A1 | 9/2011 | Milne et al. | |

(Continued)

*Primary Examiner* — Florian M Zeender
*Assistant Examiner* — Vanessa Deligi
(74) *Attorney, Agent, or Firm* — PERRY + CURRIER INC.

(57) ABSTRACT

A device, system and method managing inventory of provider objects are provided. One or more computing devices: generate one or more associated provider objects representing one or more respective associated items provided by a provider system, the associated provider object(s) including respective prices for the associated respective item(s); store, at one or more memories, the associated provider object(s); push, to an external computing device, information identifying the associated provider object(s), the external computing device being external to the provider system and the one or more computing devices, the information identifying the associated provider object(s) including the respective prices; receive, from the external computing device, an indication that a transaction associated with a provider object of associated provider objects, has occurred; in response to receiving the indication: provide, to the external computing device, the provider object; and reduce, at the one or more memories, a number of the associated provider object(s).

16 Claims, 6 Drawing Sheets

(56) References Cited

U.S. PATENT DOCUMENTS

2015/0161752 A1* 6/2015 Barreto .......... G06Q 10/063114
 705/7.15
2023/0135795 A1* 5/2023 Yang ................ H04N 21/43076
 709/201

* cited by examiner

DEVICE, SYSTEM AND METHOD FOR MANAGING INVENTORY OF PROVIDER OBJECTS

FIELD

The specification relates generally to altered provider objects, and specifically to a device, system and method for managing inventory of provider objects.

BACKGROUND

The provision of various provider objects representing products, including for example travel-related goods and services (e.g. flights, hotel reservations, and the like) typically requires various discrete entities to exchange data defining various aspects of the products. Examples of such entities, in the context of travel-related products, include airlines, travel agencies, end users, reservation systems, and the like. Although such entities may be configured to exchange data according to a standardized format (e.g. according to the eXtensible Markup Language (XML)-based New Distribution Capability (NDC) standard in the context of travel-related products), they may nonetheless employ different mechanisms to initiate the exchange of data. However, a typical exchange of data between client devices and provider systems (e.g. via intermediation servers to assist with the different mechanisms to initiate the exchange of data), may severely limit distribution of provider objects via pull mechanisms, but may provide relatively straight forward management of inventory of provider objects. On the other hand, use of provider object distribution mechanisms outside the typical client device/intermediation server/provider system may result in technical challenges with inventory management of the provider objects.

SUMMARY

A first aspect of the present specification provides a method comprising: generating, via one or more computing devices, one or more associated provider objects representing one or more respective associated items provided by a provider system, the one or more associated provider objects including respective prices for the one or more associated respective items; storing, via the one or more computing devices, at one or more memories, the one or more associated provider objects; pushing, via the one or more computing device, to an external computing device, information identifying the one or more associated provider objects, the external computing device being external to the provider system and the one or more computing devices, the information identifying the one or more associated provider objects including the respective prices; receiving, at the one or more computing devices, from the external computing device, an indication that a transaction associated with a provider object of the one or more associated provider objects, has occurred; and in response to receiving the indication: providing, via the one or more computing devices, to the external computing device, the provider object; and reducing, via the one or more computing devices, at the one or more memories, a number of the associated provider objects.

At the first aspect, the method may further comprise, in response to receiving the indication, generating a record of the transaction and the provider object.

At the first aspect, generating the one or more associated provider objects and pushing the information identifying the one or more associated provider objects to the external computing device may both occur in an absence of a shopping step at the external computing device and the one or more computing devices.

At the first aspect, the method may further comprise: updating, via the one or more computing devices, at the one or more memories, remaining provider objects, of the one or more associated provider objects, based on removal of the provider object from the one or more memories.

At the first aspect, the pushing, to the external computing device, the information identifying the one or more associated provider objects may occur via an applications programming interface translator.

At the first aspect, the method may further comprise: selecting the external computing device from a plurality of external computing devices, the selecting of the external computing device based on one or more of: one or more given rules; one or more machine learning algorithms; input received via an interface; one or more locations associated with the one or more associated provider objects; and one or more respective locations associated with the plurality of external computing devices.

At the first aspect, the method may further comprise updating the one or more associated provider objects based on one or more of: a remaining number of the one or more associated provider objects; a rate of decrease of the remaining number of the one or more associated provider objects; a time difference between a current time and a time associated with the one or more associated provider objects; a total remaining number of provider objects that include the remaining number of the one or more associated provider objects, and a respective number of other provider objects that represent other associated items, that, together with the one or more associated provider objects, represent an associated provider object inventory of the one or more respective associated items; and a respective rate of decrease of the total remaining number of provider objects.

A second aspect of the specification provides a device comprising: a communication interface; and a controller configured to: generate one or more associated provider objects representing one or more respective associated items provided by a provider system, the one or more associated provider objects including respective prices for the one or more associated respective items; store, at one or more memories, the one or more associated provider objects; push, via the communication interface, to an external computing device, information identifying the one or more associated provider objects, the external computing device being external to the provider system and the device, the information identifying the one or more associated provider objects including the respective prices; receive, via the communication interface, from the external computing device, an indication that a transaction associated with a provider object of the one or more associated provider objects, has occurred; and in response to receiving the indication: provide, via the communication interface, to the external computing device, the provider object; and reduce at the one or more memories, a number of the associated provider objects.

At the second aspect, the controller may be further configured to: in response to receiving the indication, generate a record of the transaction and the provider object.

At the second aspect, the controller may be further configured to both generate the one or more associated provider objects and push the information identifying the one or more associated provider objects to the external computing device in an absence of a shopping step at the external computing device and the controller.

At the second aspect, the controller may be further configured to: update, at the one or more memories, remaining provider objects, of the one or more associated provider objects, based on removal of the provider object from one or more memories.

At the second aspect, the pushing, to the external computing device, the information identifying the one or more associated provider objects may occur via an applications programming interface translator.

At the second aspect, the controller may be further configured to: select the external computing device from a plurality of external computing devices based on one or more of: one or more given rules; one or more machine learning algorithms; input received via an interface; one or more locations associated with the one or more associated provider objects; and one or more respective locations associated with the plurality of external computing devices.

At the second aspect, the controller may be further configured to update the one or more associated provider objects based on one or more of: a remaining number of the one or more associated provider objects; a rate of decrease of the remaining number of the one or more associated provider objects; a time difference between a current time and a time associated with the one or more associated provider objects; a total remaining number of provider objects that include the remaining number of the one or more associated provider objects, and a respective number of other provider objects that represent other associated items, that, together with the one or more associated provider objects, represent an associated provider object inventory of the one or more respective associated items; and a respective rate of decrease of the total remaining number of provider objects.

A third aspect of the present specification provides a non-transitory computer-readable medium storing a computer program, wherein execution of the computer program is to implement a method comprising: generating, via one or more computing devices, one or more associated provider objects representing one or more respective associated items provided by a provider system, the one or more associated provider objects including respective prices for the one or more associated respective items; storing, via the one or more computing devices, at one or more memories, the one or more associated provider objects; pushing, via the one or more computing device, to an external computing device, information identifying the one or more associated provider objects, the external computing device being external to the provider system and the one or more computing devices, the information identifying the one or more associated provider objects including the respective prices; receiving, at the one or more computing devices, from the external computing device, an indication that a transaction associated with a provider object of the one or more associated provider objects, has occurred; and in response to receiving the indication: providing, via the one or more computing devices, to the external computing device, the provider object; and reducing, via the one or more computing devices, at the one or more memories, a number of the associated provider objects.

At the third aspect, the method may further comprise, in response to receiving the indication, generating a record of the transaction and the provider object.

At the third aspect, generating the one or more associated provider objects and pushing the information identifying the one or more associated provider objects to the external computing device may both occur in an absence of a shopping step at the external computing device and the one or more computing devices.

At the third aspect, the method may further comprise: updating, via the one or more computing devices, at the one or more memories, remaining provider objects, of the one or more associated provider objects, based on removal of the provider object from the one or more memories.

At the third aspect, the pushing, to the external computing device, the information identifying the one or more associated provider objects may occur via an applications programming interface translator.

At the third aspect, the method may further comprise: selecting the external computing device from a plurality of external computing devices, the selecting of the external computing device based on one or more of: one or more given rules; one or more machine learning algorithms; input received via an interface; one or more locations associated with the one or more associated provider objects; and one or more respective locations associated with the plurality of external computing devices.

At the third aspect, the method may further comprise updating the one or more associated provider objects based on one or more of: a remaining number of the one or more associated provider objects; a rate of decrease of the remaining number of the one or more associated provider objects; a time difference between a current time and a time associated with the one or more associated provider objects; a total remaining number of provider objects that include the remaining number of the one or more associated provider objects, and a respective number of other provider objects that represent other associated items, that, together with the one or more associated provider objects, represent an associated provider object inventory of the one or more respective associated items; and a respective rate of decrease of the total remaining number of provider objects.

BRIEF DESCRIPTIONS OF THE DRAWINGS

For a better understanding of the various examples described herein and to show more clearly how they may be carried into effect, reference will now be made, by way of example only, to the accompanying drawings in which.

DETAILED DESCRIPTION

Figure 1:
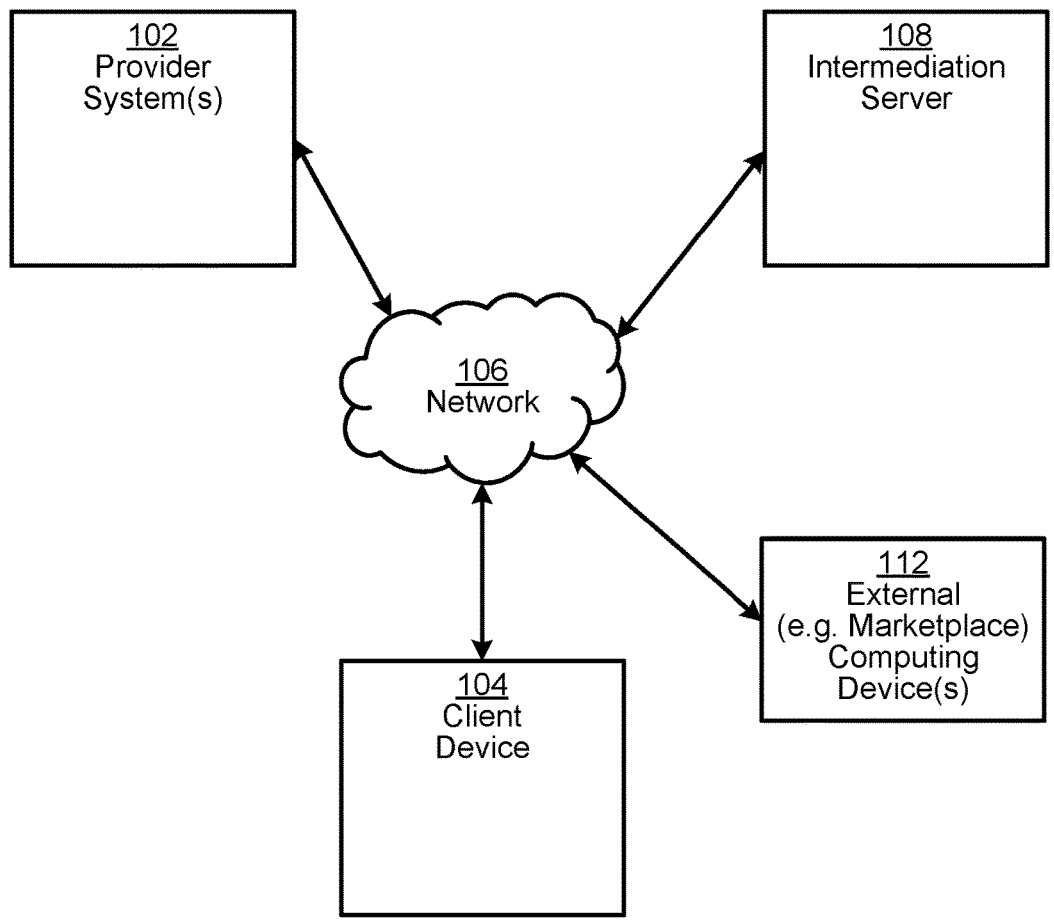
FIG. 1 depicts a system for managing inventory of provider objects, according to non-limiting examples.

FIG. 1 depicts a system 100 for managing inventory of provider objects. The various components of the system 100 are understood to be in communication via any suitable combination of wired and/or wireless communication links. Communication links between components of the system 100 are depicted in FIG. 1, and throughout the present specification, are depicted as double-ended arrows between respective components; the communication links may include any suitable combination of wireless and/or wired links and/or wireless and/or wired communication networks, and the like.

Provider objects, in the examples discussed herein, may comprise provider objects and/or data records which correspond to products and/or items, such as travel-related goods and services (e.g. flights, hotel reservations, car rentals and the like), provided by a provider system. More specifically, the products and/or items discussed in the examples below may be flight tickets and related services (e.g. limo pickup services, excursions at a destination, baggage check services, in-flight food, entertainment, pet-related services, and the like). However, as will be apparent to those skilled in the art, the systems and methods discussed below can also be applied to various other types of data objects and/or items including, but not limited to, data objects correspond to any suitable products and/or any suitable items available (e.g. for purchase, and the like) from any suitable website, and the like.

A provider object is understood to define an item, or a combination of items, which may be offered for purchase (e.g. by end users of the items) including, but not limited to one or more of flights, train rides, hotel stays, airport lounge access, seat upgrades, baggage check services, in-flight food, entertainment, pickup services, excursion services, pet-related services, and the like, and/or associated services. Thus, in examples discussed below, a provider object may define a flight operated by the provider entity, and/or services associated with the flight, or proposed as standalone services. Each provider object therefore may contain various fields (e.g. data fields), and the like. Certain fields define item attributes, such as product object identifiers (e.g. service identifiers, item identifiers, product identifiers and the like), locations, dates and times corresponding to the products (e.g. flight times and other itinerary data), amongst other possibilities. Indeed, the fields may define any suitable item attributes, which may include, but are not limited to, terms and conditions (e.g. eligibility criteria, offer validity duration, change and cancellation penalties, and the like), payment information (e.g. price, price breakdown, taxes, accepted forms of payment, and the like), media (e.g. pictures, videos, sound, translation of other fields in various languages, and the like), technical components (e.g. unique identifications of an object and/or items and/or services, a name of a provider owner, a computer gateway address, a protocol type and/or version, tokens, and the like), amongst other possibilities. Accordingly, the type of fields and/or data of a provider object may depend on a type of a provider object. For example, provider objects corresponding to flights may include flight identifiers, whereas provider objects corresponding to other travel-related items, such as an offer for accessing an airport lounge and/or an offer for a premium seat upgrade, may include information related to the lounge, the premium seat, etc.

Delivery of the items mentioned above is typically controlled by a provider entity, such as an airline in the case of the items discussed in connection with the travel-industry related examples provided herein. The system 100 includes one or more provider systems 102 (e.g. one or more servers or other suitable computing devices), which in this example is operated by one or more provider entities. The system 100 can include a plurality of client devices 104, although only one client device 104 is shown in FIG. 1 for illustrative purposes.

The system 100 can include a plurality of provider systems 102, each operated by respective provider entities (e.g. various airlines), although only one provider system 102 is shown for illustrative purposes. The provider objects may be in any suitable format including, but not limited to Edifact recommendations in the context of Global Distribution System (GDS)-based data exchange, offer records in the context of New Distribution Capability (NDC)-based data exchange, and/or any other suitable format. Indeed, the provider objects may comprise data objects and/or data records, for example storing an Edifact recommendation or an NDC offer, and/or any other suitable data representing at least one item provided by the provider system 102.

In traditional provider object distribution mechanisms for distribution of provider objects, requests for provider objects may be received at the provider system 102 from other components of the system 100. For example, the requests may be received from a client device 104, via a network 106 (e.g. any suitable combination of local and wide area networks, including the Internet) and via an intermediation server 108. While optional, when present, the intermediation server 108 generally intermediates between the client device 104 and the provider system 102, for example such that the client device 104 may request products from the provider system 102 (and/or more than one provider system 102) via the intermediation server 108. As such, it is understood that traditional provider object distribution mechanisms are "pull" distribution mechanisms which rely on requests from client devices 104, such that the client devices 104 pull provider objects.

In some examples, the intermediation server 108 may convert data between formats associated with provider systems 102 and the client device 104. For example, a first provider system 102 may communicate and/or provide provider objects, and/or offers for provider objects, according to a first format, and a second provider system 102 may communicate and/or provide provider objects, and/or offers for provider objects, according to a second format (e.g. which may be the same or different from the first format). Neither format may be compatible with a format used by the client device 104 to communicate. As such, the intermediation server 108 may convert data received in different formats from the provider system 102, to a format compatible with the client device 104, and vice versa.

In one example, the intermediation server 108 may comprise an aggregator server which communicates with a plurality of provider systems 102 and aggregates provider objects and/or offers for provider objects from the plurality of provider systems 102, to provide to the client device 104 (e.g. in pull distribution mechanisms). When formats of data used by the provider systems 102 and the client device 104 are compatible, the intermediation server 108 may not perform the conversions described herein when performing the aggregation functionality.

However, in some examples, a provider system 102 may operate the intermediation server 108. Hence, it is understood that while the provider system 102 and the intermediation server 108 are all depicted as being separate from each other in FIG. 1, they may be associated with various combinations of one or more entities, and/or functionality of the provider system 102 and the intermediation server 108 may be combined in any suitable manner at one or more computing devices and/or servers and/or cloud computing devices. Similarly, in traditional provider object delivery mechanisms, provider system 102 and/or the intermediation server 108 may operate the client device 104.

As such, herein, rather than refer to certain components of the system 100 communicating via transmitting data therebetween (e.g. such as via the network 106), herein communication between components of the system 100 is referred to as the components providing data, and the like, therebetween which may include, but is not limited to, transmitting data over the network 106, communicating data when the components are local to each other and/or combined, and the like.

Various mechanisms for the creation of provider objects will be apparent to those skilled in the art, such as the "offer" and "order" mechanisms specified by the NDC standard. However, the terms "offer" and "order" as used herein may be more generic; for example, an offer for a provider object may refer to any suitable indication of provider object that may be available, for example for purchase, while an order for a provider object may refer to any suitable request to book and/or purchase a provider object that was previously indicated as being available.

The provider objects provided by the provider system 102 generally include provider object data representing at least one item provided by the provider system 102. In some examples, the provider object data may include a provider object identifier and/or provider object identifier data, that identifies the provider object to the provider system 102. The provider object data generally comprises information that identifies a travel related product and/or service. Whether the provider object data includes a specific provider object identifier, or not may depend on whether a provider object is being in an NDC or GDS format. For example, when a provider object comprises an NDC offer, the provider object identifier data may comprise an identifier generated by the provider system 102 which specifically identifies the NDC offer. However, when a provider object comprises an Edifact recommendation, which generally does not include a specific identifier, the Edifact recommendation may be identified by the provider system 102 based on provider object identifier data such as characteristics of the Edifact recommendation such as a specific order and/or format of data of the Edifact recommendation.

In traditional provider object delivery mechanisms, the client device 104, in the present example, may be operated by a travel agent entity, and therefore generates and provides requests for provider objects (e.g. representing products which may be for purchase), and/or requests to purchase products (e.g. represented by the provider objects), to the provider system 102, via the intermediation server 108, on behalf of end users (e.g. travelers). However it is understood that the client device 104 may request that any suitable actions, and the like, associated the provider objects, occur, for example via the intermediation server 108.

Such a pull distribution system for provider objects, and specifically travel-related provider objects, allows for easy management of inventory of the provider objects, which generally have a limited shelf-life and/or expiry dates and/or times, as well as limited inventory. Continuing with travel-related examples involving flights, provider objects as described herein may correspond to seats on a given flight; as such, there may be a limited number of the provider objects for a given flight. Furthermore such provider objects have an expiry date: once the flight is closed for boarding, and/or at a given time period before the flight, seats on the flight may no longer be available, and hence any existing provider objects for the flight are understood to have expired. Nonetheless, as the provider objects are generally provided via a provider system 102, the provider system 102 may easily track numbers of provider objects (e.g. inventory of seats) available for a given flight, and the like.

However, as depicted in FIG. 1, the system 100 further comprises one or more external computing devices 112, which may comprise marketplace computing devices operated by third party entities that provide goods and/or enable transactions for goods. Traditionally, provider objects as described herein have not been distributed through such external computing devices 112 for a variety of reasons, including, but not limited to, challenges with managing inventory of provider objects that may be provided, via such external computing devices 112, to a client device 104 (e.g. rather than directly via a provider system 102 and/or via the intermediation server 108). However, distribution of provider objects via external computing devices 112, along with inventory management of the provider objects, and specifically pushing information identifying one or more associated provider objects to one or more external computing devices 112, will be described in more detail below.

Indeed, distributing provider objects via such external computing devices 112 may have advantages, such as more rapid distribution of the provider objects than when using the traditional client device/intermediation server/provider system provider object delivery mechanisms, which generally rely on proactive searching by the client device 104 such that provider objects are pulled to a client device 104.

Hence, hereafter, reference to traditional client device/intermediation server/provider system provider object delivery mechanisms may be interchangeably referred to as a pull distribution mechanism (e.g. a client devices 104 requests and receives (e.g. pulls) provider objects.

It is further understood that the term "external computing device" refers to computing devices that are external to the provider system 102 and/or the intermediation server 108 which may, for example, be operated by third party entities different from entities operating the provider system 102 and/or the intermediation server 108.

Figure 2:
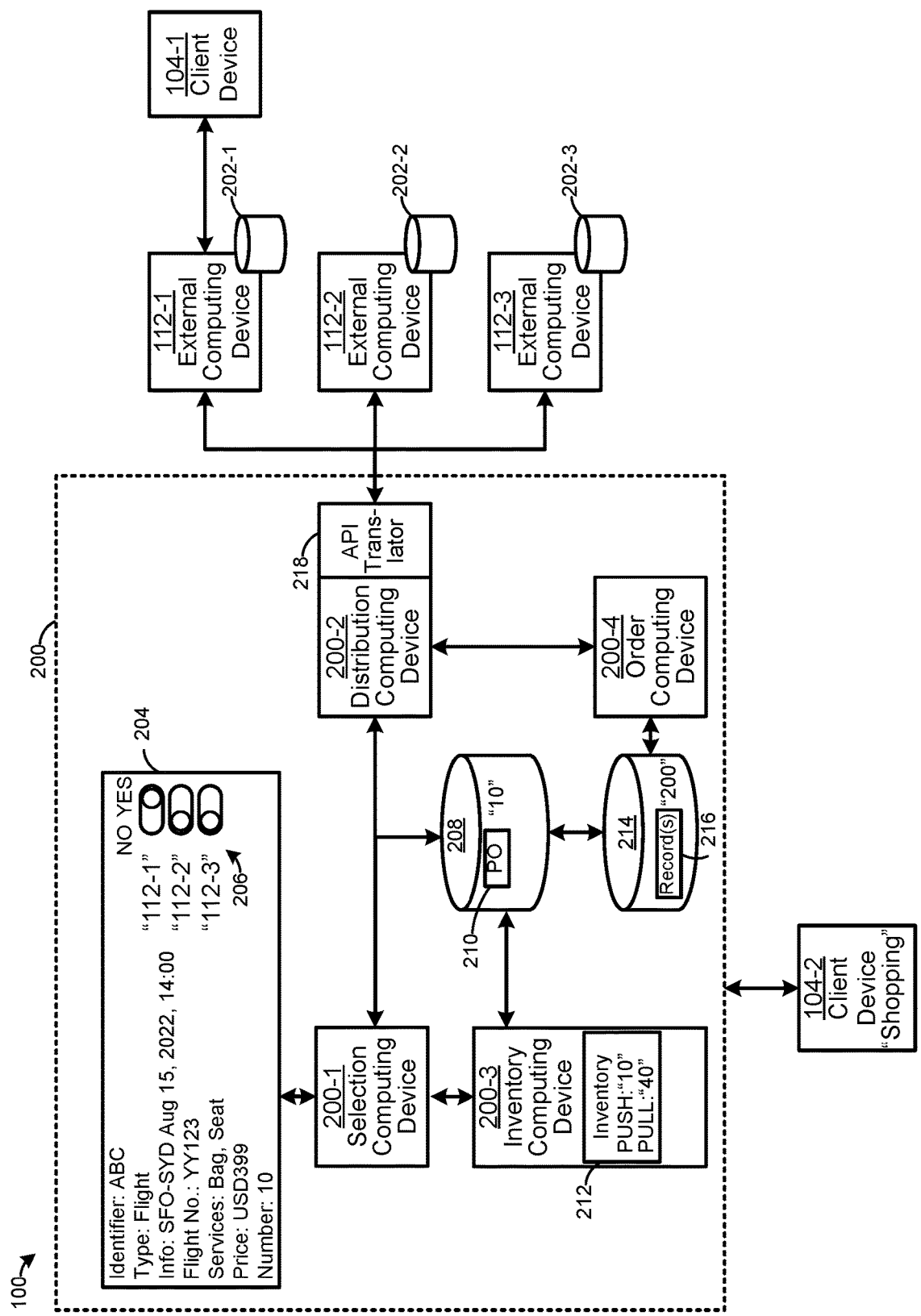
FIG. 2 depicts the system of FIG. 1 in further detail, according to non-limiting examples.

Turning now to FIG. 2, a more detailed block diagram of the system of FIG. 1 is depicted, which comprises one or more computing devices 200 which may be associated with, and/or operated by, the provider system 102; however, in other examples, where suitable, a portion of the one or more computing devices 200 may be operated by an entity that manages the intermediation server 108.

Furthermore, it is understood that while the computing devices 200 are all depicted as being separate from each other in FIG. 1, functionality of the computing devices 200 may be combined in any suitable manner at one or more computing devices and/or servers and/or cloud computing devices.

In FIG. 2, the system 100 is depicted with a plurality of external computing devices 112-1, 112-2, 112-3, which are respectively associated with corresponding databases and/or memories 202-1, 202-2, 202-3, which are interchangeably referred to hereafter, collectively, as the memories 202 and, generically and/or individually as a memory 202. While three external computing devices 112 are depicted, it is understood that the system 100 may comprise as few as one external computing device 112, or two external computing devices 112, or more than three external computing devices 112.

Furthermore, a given external computing device 112 may be associated with a respective given location. For example, a first external computing device 112-1 may be generally dedicated to enabling transactions of goods in North America and/or a given country, such as the United States. Similarly, a second external computing device 112-2 may be generally dedicated to enabling transactions of goods in Latin America, and/or a given country, such as Brazil. Similarly, a third external computing device 112-3 may be generally dedicated to enabling transactions of goods in Asia, and/or a given country, such as China.

Furthermore, as depicted in FIG. 2, the system 100 comprises a plurality of client devices 104-1, 104-2. While two client devices 104 are depicted, it is understood that the system 100 may comprise as few as one client device 104, or more than two client devices 104.

In particular, a first client device 104-1 is in communication with a first external computing device 112-1. While not depicted, the first client device 104-1 may be in communication via others of the external computing devices 112. As will be described below, the first external computing device 112-1 may be used to provide provider objects to the first client device 104-1 in push distribution mechanism different from a pull distribution mechanism.

However, a second client device 104-2 may be in communication with one or more of the computing devices 200, and the one or more computing devices 200 may be used to provide provider objects to the second client device 104-2 according to a pull distribution mechanism. For example, steps of offering and ordering a provider object may occur according to a predefined series of steps, which may include a requesting step, a selecting step, a booking step and a paying step. It is understood, however, that such steps are not meant to be exhaustive, and other steps may occur. However, at a requesting step, which may also be referred to as a "Shopping" step (e.g. as depicted), the second client device 104-2 may request provider objects from one or more provider systems 102 via the intermediation server 108 (and/or via direct interactions with one or more provider systems 102, for example without using the intermediation server 108), and the one or more provider systems 102 and/or the intermediation server 108 may respond with provider objects which meet the criteria in the request. At a selecting step, the second client device 104-2 may select a provider object to be booked, and at a booking step, the second client device 104-2 may book the selected provider object. At a payment and/or transaction step, the second client device 104-2 may pay for, and hence purchase the selected provider object. However, such a mechanism is inherently a pull distribution mechanism, which relies on the second client device 104-2 requesting available provider objects.

As depicted, the computing devices 200 include, but are not limited to:

A selection computing device 200-1, generally configured to select to which of the external computing devices 112 to push information identifying one or more associated provider objects. In some examples, such selection may be managed via rules and/or machine learning algorithms, as described below. In other examples, as depicted, such selection may be managed via an optional interface 204, described in more detail below. In an example depicted at the interface 204, provider objects that represent seats on a flight from San Francisco Airport (e.g. "SFO") to Sydney Airport (e.g. "SYD") on Aug. 15, 2022, at 14:00 (e.g. 2 pm), with a price of USD 399, will be discussed, the provider objects including data representing associated services, such as a checked "Bag" and a pre-booked "Seat". Such information, identified by an identifier "ABC" is provided at the interface 204. Furthermore, the interface 204 further indicates that a number of provider objects, for example, as depicted up to "10" provider objects, are to be made available to distribute via the external computing devices 112. While not depicted, the interface 204 may further indicate a fare class (e.g. such as economy) for the seats. As will be described, the interface 204 further includes a selection mechanism 206 for selecting to which of the external computing devices 112 to push information identifying one or more associated provider objects; in particular, the selection mechanism 206 comprises respective electronic toggle switches to select (e.g. "YES" to the left) or deselect (e.g. "NO" to the right) a respective external computing device 112. It is understood that the interface 204, including the selection mechanism 206, may be rendered at a display screen (not depicted) available to an operator of the selection computing device 200-1, and the operator may interact with the selection mechanism 206 to select (or deselect) one or more external computing devices 112. As depicted, only the first external computing device 112-1 (e.g. "112-1") is selected. While not depicted, the interface 204 may further include a selection mechanism for selecting: the number of the provider objects and/or a respective number of provider objects for which information identifying one or more associated provider objects is to be sent to a particular external computing device 112; which provider objects for which information identifying the provider objects are to be sent to a particular external computing device 112, and numbers and/or provider objects for which information is to be sent may the same or different for different external computing devices 112 (e.g. such that a first external computing device 112 may be sent information identifying a first number of first provider objects and a second external computing device 112 may be sent information identifying a second number of second provider objects, and the first and second provider objects may be at least partially the same, or at least partially different from each other, or completely different from each other); a fare class of the provider objects; services for the provider objects; amongst other possibilities. While the interface 204 is understood to be optional in some examples, the information depicted at the interface 204 will be used as example information at least partially defines associated provider objects, described hereafter.

A distribution computing device 200-2, generally configured to push information identifying one or more associated provider objects to external computing devices 112 selected via the selection computing device 200-1. As depicted, the system 100 further comprises a memory 208 which may store provider objects 210 (and/or offers for provider objects) that are not associated with a transaction. In a particular example, the provider objects 210 may represent unfilled seats on the flight indicated at the interface 204. For example, as depicted, the flight may include "10" provider objects (e.g. indicated by the interface 204) for which a respective transaction has not occurred. In particular, the provider objects 210 are understood to be associated, as they are associated with a same flight and/or represent seats on a same flight; however, the provider objects 210 may be further understood to be associated as the provider objects 210 all represent seats on the same flight, all having a same initial fare (e.g. and fare class), and same initial associated services.

An inventory computing device 200-3 generally configured to maintain an inventory 212 of provider objects, and generate provider objects including the associated provider objects 210 that may be provided to one or more of the external computing devices 112 via push distribution mechanisms, as well as other provider objects that may be provided via pull distribution mechanisms, such as to the second client device 104-2, and the like. For example, as depicted, the inventory computing device 200-3 may maintain the inventory 212 of "10" provider objects 210 that are represented at the memory 208 (e.g. available to the external computing devices 112 via a "PUSH" distribution mechanism), and "40" other provider objects that represent other seats on the same flight, but which may be available via a "PULL" distribution mechanism different from the external computing devices 112. Put another way, there are a total of "50" seats available on the flight from SFO to SYD on Aug. 15, 2022 at 14:00, and "40" of them are available via traditional provider object delivery mechanisms, while "10" of them are to be made available via one or more of the external computing devices 112. However, in other examples, all the provider objects in the inventory 212 may be made available via both traditional provider object delivery mechanisms and via the external computing devices 112. However, in other examples, all of the provider objects in the inventory 212 may be made available via traditional provider object delivery mechanisms and a subset of the provider objects in the inventory 212 may be made available via the external computing devices 112 (e.g. such that a subset of the total number of provider objects in the inventory 212 are made available across both the traditional provider object delivery mechanisms and via the external computing devices 112, while the remainder are made available only via the traditional provider object delivery mechanisms). Similarly, in other examples, all of the provider objects in the inventory 212 may be made available via the external computing devices 112 and a subset of the provider objects in the inventory 212 may be made available via traditional provider object delivery mechanisms (e.g. such that a subset of the total number of provider objects in the inventory 212 are made available across both the traditional provider object delivery mechanisms and via the external computing devices 112, while the remainder are made available only via the external computing devices 112). In general, the inventory computing device 200-3 may generate provider objects in any suitable manner, for example, when a provider system 102 schedules a flight, and assigns given aircraft to the flight having a given number of seats; the inventory computing device 200-3 may then generate provider objects representing such seats, for example according to different prices and/or fare classes, and the like. However, such provider object generation functionality may be performed by any suitable computing device 200. Furthermore, An order computing device 200-4, generally configured to maintain records of provider objects for which a transaction has occurred (e.g. booked and paid for, which may also be referred to as being ordered). For example, as depicted, the order computing device 200-4 has access to a memory 214, which stores records 216 of provider objects on the flight identified in the optional interface 204 which are associated with a transaction. Indeed, as depicted, it is understood that "200" seats for the flight have been ordered. Hence, combined with the "50" seats still available in the inventory 212, it is understood that there are "250" seats available for the flight. Alternatively, the order computing device 200-4 may also store records of provider objects that have been booked and must be paid before (e.g. at the aforementioned paying step), for example, before a defined expiration time.

While not depicted, the computing device 200 may comprise any other suitable computing devices, including, but not limited to, computing devices for providing provider objects to the second client device 104-2, for example based on requests for provider objects from the second client device 104-2 in a shopping step, in a pull distribution mechanism, as described above.

Furthermore, as depicted, the distribution computing device 200-2 may comprise an Applications Programming Interface (API) translator 218, however the API translator 218 may comprise another computing device 200 separate from the distribution computing device 200-2. Regardless of architecture, the distribution computing device 200-2 may push information identifying one or more associated provider objects to the external computing devices 112 via the API translator 218, which may translate and/or convert the information to a format compatible with respective APIs of the external computing devices 112, which may be the same or different one another. When the respective APIs of two or more of the external computing devices 112 are different from one another, it is understood that the API translator 218 translates and/or formats the information for the respective APIs to which the information is being pushed. The API translator 218 may similarly translate and/or convert information received from the external computing devices 112 to a format compatible an API of the distribution computing device 200-2.

Figure 3:
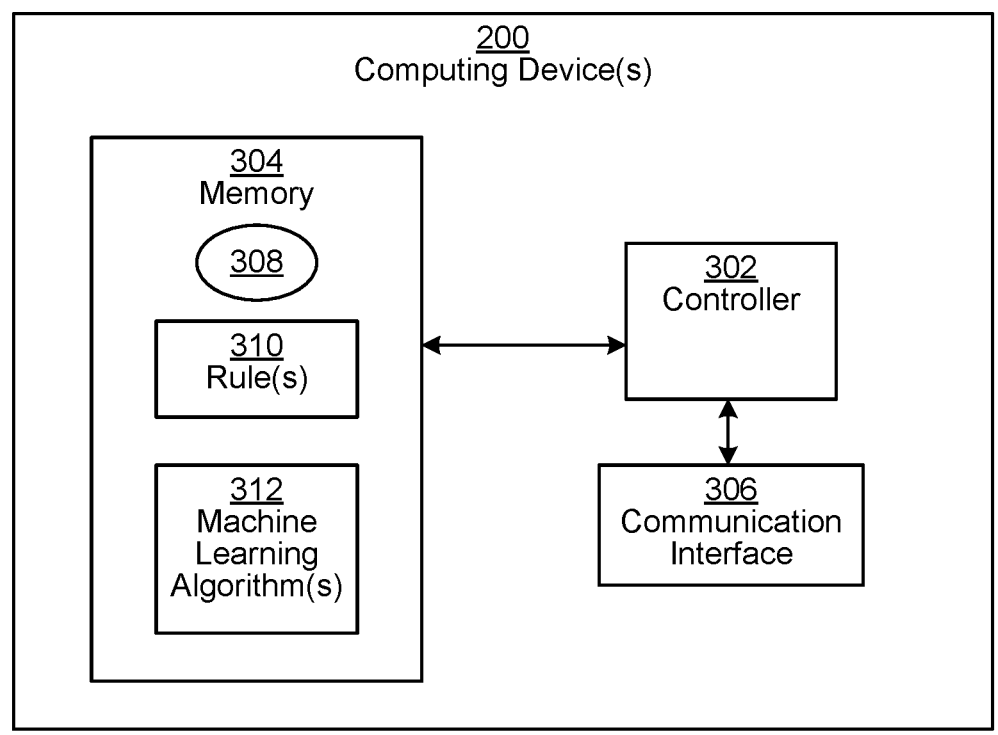
FIG. 3 depicts an example computing device for managing inventory of provider objects, according to non-limiting examples.

Turning to FIG. 3, before discussing the functionality of the system 100 in greater detail, certain components of a computing device 200, of the one or more computing devices 200, will be discussed in greater detail. While depicted in FIG. 3 as one device, the depicted computing device 200 may comprise one or more computing devices and/or one or more servers and/or one or more cloud computing devices that may be geographically distributed.

As shown in FIG. 3, the computing device 200 includes at least one controller 302 interconnected with a memory 304 and communication interface 306.

The controller 302 may comprise a processor and/or a central processing unit (CPU), and the like. As depicted, the memory 304 stores an application 308, and the memory 304 may be implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The controller 302 and the memory 304 are generally comprised of one or more integrated circuits (ICs).

The controller 302 is also interconnected with the communication interface 306, which enables the one or more computing devices 200 to communicate with the other components of the system 100 (i.e. other computing devices 200, the client devices 104, the external computing devices 112, and the like) for example via a network, though it is understood such communication may occur locally when one or more computing devices 200 are combined. The communication interface 306 therefore may include any necessary components (e.g. network interface controllers (NICs), radio units, and the like) to communicate via a network. The specific components of the communication interface 306 may be selected based on upon the nature of network and/or local communication between components of the system 100, and the like. The computing device 200 may also include input and output devices connected to the controller 302, such as keyboards, pointing devices, displays, and the like (not shown).

The components of the computing device 200 mentioned above can be deployed in a single enclosure, or in a distributed format. In some examples, therefore, the computing device 200 may include a plurality of processors, either sharing the memory 304 and communication interface 306, or each having distinct associated memories and communication interfaces. As such, it is understood that the memory 304, and/or a portion of the memory 304, may be internal (e.g. as depicted) or external to the computing device 200; regardless, the controller 302 is understood to have access to the memory 304.

The memory 304 generally stores a plurality of computer-readable programming instructions, executable by the controller 302, in the form of various applications, including the application 308. As will be understood by those skilled in the art, the controller 302 executes the instructions of the application 308 (and any other suitable applications) in order to perform various actions defined by the instructions contained therein. In the description below, the controller 302, and more generally the computing device 200 (and/or the one or more computing devices 200), are understood to be configured to perform those actions. It will be understood that they are so configured via the execution (by the controller 302) of the instructions of the applications (e.g. the application 308) stored at the memory 304.

While not depicted, the memory 304 may comprise one or more of the memories 208, 214. Alternatively, one or more of the memories 208, 214, and/or portions thereof, may be implemented at other computing devices (not depicted) of the provider system 102, which may be dedicated to maintaining one or more of the memories 208, 214.

In some examples, execution of the application 308, as will be discussed below, configures the computing device 200 to implement functionality for managing inventory of provider objects, including but not limited to, the blocks of a method set forth in FIG. 4.

As depicted, the memory 304 further stores rules 310 and/or one or more machine learning algorithms 312, which may be stored (e.g. as depicted) separately from the application 308, or as modules of the application 308.

The one or more rules 310 may comprise any suitable rules and/or instructions for selecting one or more external computing devices 112, from a plurality of external computing devices 112, to which to push information identifying the one or more associated provider objects 210. For example, the one or more rules 310 may indicate that information identifying one or more associated provider objects associated with a flight are to be pushed only to one or more external computing devices 112 that are associated with a location of an originating airport of the flight. Alternatively, the one or more rules 310 may indicate that information identifying one or more associated provider objects associated with a flight are to be pushed only to one or more external computing devices 112 that are associated with a location of a destination airport of the flight. Hence, returning to the example of the information provided at the interface 204, as the provider objects 210 are for a flight that originates at SFO (e.g. in the United States) and ends at SYD (e.g. in Australia), the one or more rules 310 may cause the computing device 200 to push information identifying the provider objects 210 to one or more certain external computing device 112 (e.g. associated with the United States and/or Australia), such as the first external computing device 112-1 but not the other external computing devices 112 (e.g. associated with Asia and/or Europe and/or Latin America, etc.).

Similarly, the one or more machine learning algorithms 312 may comprise any suitable set of classifiers and/or neural network layers for selecting one or more external computing devices 112, from a plurality of external computing devices 112, to which to push information identifying the one or more associated provider objects 210, for example, using the one or more associated provider objects 210 as input. For example, and again continuing with the example of the flight identified at the interface 204, the one or more machine learning algorithms 312 may be trained to push information identifying one or more associated provider objects, associated with a flight, only to one or more external computing devices 112 that are associated with a location of an originating airport and/or a destination airport of the flight. Hence, as the provider objects 210 are for a flight that originates at SFO and ends at SYD, the one or more machine learning algorithms 312 may cause the computing device 200 to push information identifying the provider objects 210 to one or more external computing device 112 associated with the United States and/or Australia, such as the first external computing device 112-1, but not the other external computing devices 112 associated with Asia and/or Europe and/or Latin America, etc.

However, the one or more machine learning algorithms 312 may continue to be trained. For example, based on historical and/or training data that indicates that provider objects representing seats on flights between SFO and SYD are associated with transactions that occur in association with Latin America and/or Asia, the one or more machine learning algorithms 312 may be trained to also select an external computing device 112 associated with Latin America (e.g. such as the second external computing device 112-2) and/or Asia (e.g. such as the third external computing device 112-3) to which to push information identifying the provider objects, but not other external computing devices 112 (e.g. associated with Europe).

However the one or more rules 310 and/or the one or more machine learning algorithms 312 may be used to perform any other suitable functionality. For example, the one or more rules 310 and/or the one or more machine learning algorithms 312 may be further for determining a number of one or more associated provider objects 210 for which information, identifying the one or more associated provider objects 210, is be pushed to the one or more external computing devices 112. Similarly, the one or more rules 310 and/or the one or more machine learning algorithms 312 may be further for determining when to push information, identifying the one or more associated provider objects 210, to the one or more external computing devices 112. In a particular example relating to a given flight, the one or more rules 310 and/or the one or more machine learning algorithms 312 may be configured to cause the controller 302 to select a number of associated provider objects 210 (e.g. from available provider objects in the inventory 212) representing a given percentage of seats for the given flight for which a transaction has not occurred (e.g. in a given fare class, such as economy), when a total given percentage (e.g. 25%, 30%, 50% or any other suitable percentage) of the seats for the given flight as not associated with a transaction five days (and/or any other suitable time period) before the flight, and push the information, identifying the one or more associated provider objects 210, the one or more external computing devices 112, once selected. In particular, the one or more machine learning algorithms 312 may be trained to select a number of the one or more associated provider objects 210 and when to push information identifying the one or more associated provider objects 210 to the one or more external computing devices 112 based, for example, on previous transactions associated with seats for previous flights which represent best case scenarios for filling a maximum number of seats for the previous flights (e.g. as determined heuristically, and/or in any other suitable manner).

In further examples, the one or more rules 310 and/or the one or more machine learning algorithms 312 may be further for modifying a price associated with a provider object based on any suitable factors, which may include, but are not limited to: a quantity of associated provider object available and/or which remain; a time to departure associated with a provider object (e.g. presuming the provider object represents a flight, and the like); rates of decrease of the associated provider objects (e.g. a "high" rate of decrease may cause a price to increase and/or a "low" rate of decrease may cause a price to decrease, with "high" and "low" rates being heuristically determined and/or defined relative to a threshold rate which may also be heuristically determined such that a "high" rate of decrease may be above the threshold rate and a "low" rate of decrease may be below the threshold rate; indeed, more than one threshold rate may be defined such that price may increase or decrease in different ways depending on a rate of decrease as compared to a plurality of threshold rates).

While structure of the client devices 104 and the external computing devices 112 are not described in detail, the client devices 104 and the external computing devices 112 are understood to have a similar structure as the computing device 200, but adapted for the functionality of the client devices 104 and the external computing devices 112.

Figure 4:
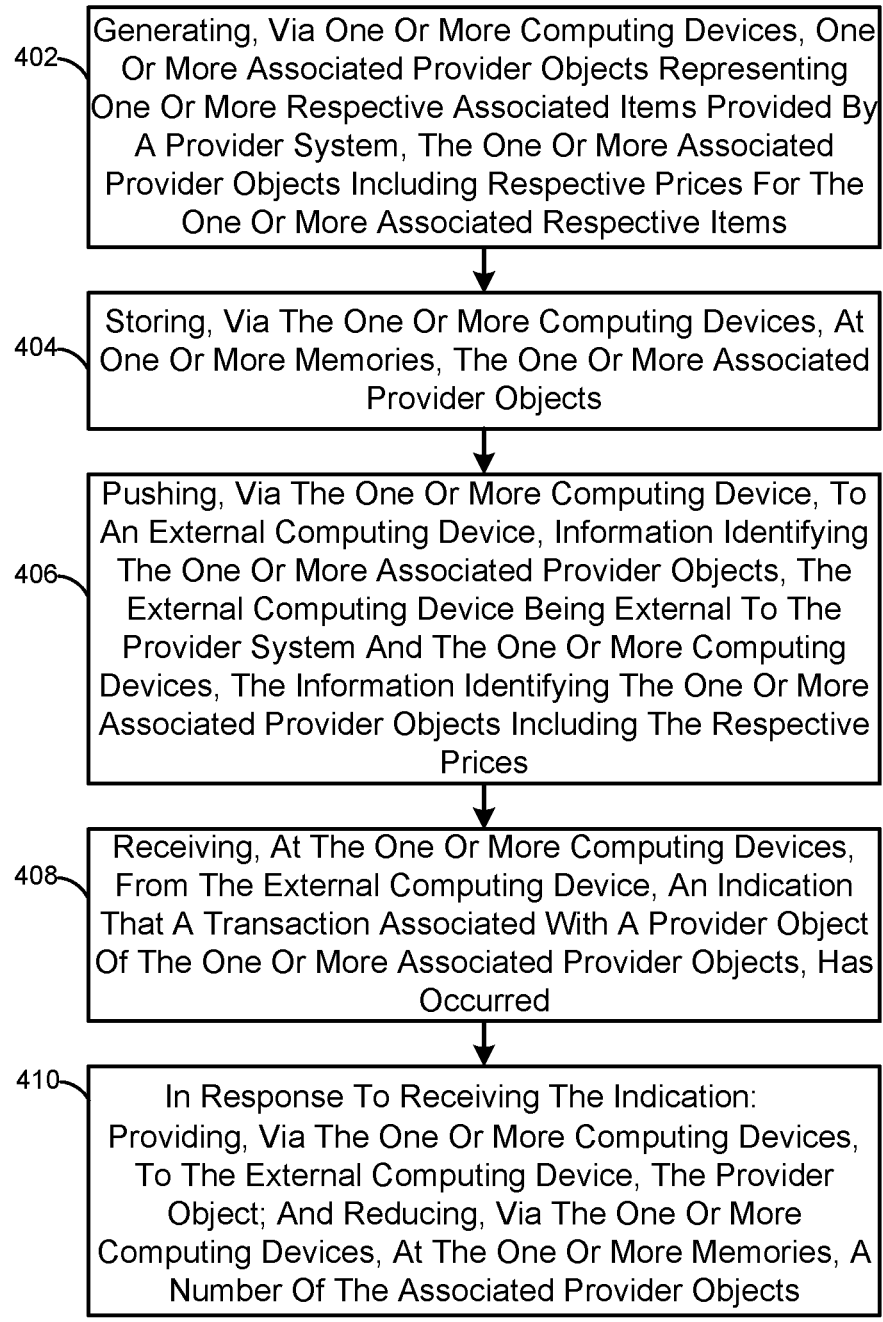
FIG. 4 depicts a method for managing inventory of provider objects, according to non-limiting examples.

Attention is now directed to FIG. 4, which depicts a flowchart representative of a method 400 a method for managing inventory of provider objects. The operations of the method 400 of FIG. 4 correspond to machine readable instructions that are executed by the one or more computing devices 200, for example by a controller 302 of the one or more computing devices 200. In the illustrated example, the instructions represented by the blocks of FIG. 4 are stored at the memory 304 for example, as the application 308. The method 400 of FIG. 4 is one way in which the controller 302 and/or the one or more computing devices 200 and/or the system 100 may be configured. Furthermore, the following discussion of the method 400 of FIG. 4 will lead to a further understanding of the system 100, and its various components.

The method 400 of FIG. 4 need not be performed in the exact sequence as shown and likewise various blocks may be performed in parallel rather than in sequence. Accordingly, the elements of method 400 are referred to herein as "blocks" rather than "steps." The method 400 of FIG. 4 may be implemented on variations of the system 100 of FIG. 1, as well.

Furthermore, while the method 400 is described with respect to the examples of FIG. 2, and provider objects referred to in the following description include the provider objects 210, it is appreciated that any suitable provider objects are within the scope of the present specification including any suitable provider objects that that have a limited life and/or an expiry date and/or time, and are of a limited quantity.

At a block 402, the controller 302 and/or the one more computing devices 200 generates one or more associated provider objects 210 representing one or more respective associated items provided by a provider system 102, the one or more associated provider objects 210 including respective prices for the one or more associated respective items.

For example, the inventory computing device 200-3 (and the like) may generate such associated provider objects 210 and store an inventory 212 of such provider objects 210. Alternatively, any suitable computing device 200 (e.g. associated with a provider system 102) may generate such provider objects 210, and further set a price for the one or more associated provider objects 210 (e.g. according to rules of a provider system 102). It is further understood that the one or more associated provider objects 210 may not represent all the provider objects available (e.g. the one or more associated provider objects 210 may represent a subset of seats on a given flight, and other provider objects may represent other seats on the given flight, such as the "50" represented in the inventory 212 depicted in FIG. 2), and that an associated price for the one or more associated provider objects 210 may be different, or the same as, other prices for the provider objects.

Furthermore, a number of the one or more associated provider objects 210 that are generated may be determined via the one or more rules 310, the one or more machine learning algorithms 312, the interface 204, and/or in any other suitable manner, as described above.

At a block 404, the controller 302 and/or the one more computing devices 200 stores, at one or more memories 208, the one or more associated provider objects 210. Such storing indicates that the one or more associated provider objects 210 are being distributed via one or more of the external computing devices 112 via push distribution mechanism, and furthermore provides a mechanism for tracking inventory of the one or more associated provider objects 210.

At a block 406, the controller 302 and/or the one more computing devices 200 pushes, to an external computing device 112, information identifying the one or more associated provider objects 210, the external computing device 112 being external to the provider system 102 and the one or more computing devices 200, the information identifying the one or more associated provider objects 210 including the respective prices.

It is further understood that while the block 406 is described with respect to pushing information identifying the one or more associated provider objects 210 to one external computing device 112, at the block 406, the information may be pushed to one or more external computing devices 112. However, for simplicity, it is assumed hereafter that the information is pushed to the first the external computing device 112-1, for example as the first the external computing device 112-1 is selected at the interface 204 via the selection mechanism 206.

For example, the information that is to be pushed to the first external computing device 112-1 may comprise any suitable information which identifies the one or more associated provider objects 210 and an associated price. For example, such information may include the information depicted at the interface 204 as depicted in FIG. 2 (e.g. excluding the selection mechanism 206).

In particular, at the block 404 and the 406, the controller 302 and/or the one more computing devices 200, are understood to both generate the one or more associated provider objects 210 and push the information identifying the one or more associated provider objects 210 to the first external computing device 112-1 in an absence of a shopping step at the first external computing device 112-1 and the one or more computing devices 200. Put another way, the first external computing device 112-1 does not provide a request to the one or more computing devices 200 that includes search criteria for flights, and the like. Rather, decisions about which provider objects 210 to distribute via first external computing device 112-1, and when to push the information identifying the one or more associated provider objects 210 to the first external computing device 112-1 are made at the one or more computing devices 200. Put another way, the aforementioned shopping step, which occurs at the second client device 104-2 are not implemented in the execution of the method 400.

It is further understood that the pushing, via the one or more computing device, to the first external computing device 112-1, the information identifying the one or more associated provider objects 210 may occur via the applications programming interface translator 218, as described above. For example, the information may identify the first external computing device 112-1 (e.g. via any suitable identifier and/or network address, and the like) and the API translator 218 may have access to predetermined and/or preconfigured translation and/or formatting data which instructs the API translator 218 on how to format the information being pushed according to a respective API of the first external computing device 112-1. The API translator 218 translates and/or formats the information being pushed accordingly, and provides the translated and/or formatted information to the first external computing device 112-1.

It is further understood that the method 400 may further comprise (e.g. at the block 406 and/or prior to the block 406), the controller 302 and/or the one or more computing devices 200: selecting the first external computing device 112-1 from a plurality of external computing devices 112, the selecting of the first external computing device 112-1 (and/or one or more external computing devices 112) based on one or more of:

One or more given rules, such as the one or more rules 310, which may comprise instructions on which external computing devices 112 to select.

One or more machine learning algorithms, such as the one or more machine learning algorithms 312, which may be trained to select external computing devices 112.

Input received via an interface, such as the selection mechanism 206 of the interface 204; it is understood that, in these examples, the interface 204 may be rendered at a display screen and an operator may operate an input device to select the first external computing device 112-1 and/or more than one external computing device 112, via the selection mechanism 206, as described above.

One or more locations associated with the one or more associated provider objects 210. For example, as described above, external computing devices 112 may be selected on the basis of an originating airport associated with the one or more associated provider objects 210, or a destination airport associated with the one or more associated provider objects 210.

One or more respective locations associated with the plurality of external computing devices 112. For example, as described above, external computing devices 112 may be selected on the basis of associated locations in which goods and/or services are distributed.

At a block 408, the controller 302 and/or the one more computing devices 200 receives, from the first external computing device 112-1, an indication that a transaction associated with a provider object 210 of the one or more associated provider objects 210, has occurred.

For example, it is understood that, when the first external computing device 112-1 to which the information is pushed (e.g. at the block 408) receives the information, the information may be made available to the first client device 104-1, for example along with any suitable information indicating that the associated provider objects 210 are available, for example at a given price. Such information may also be pushed to the first client device 104-1, for example in banner information, and the like, when an operator of the first client device 104-1 is interacting with (e.g. a website of) the first external computing device 112-1 and searching for items related to the associated provider objects 210, such as suitcases, sleep-masks and/or pillows for use on airplanes and the like. Indeed, the first external computing device 112-1 may execute any suitable algorithms for pushing the information identifying the one or more associated provider objects 210 (e.g. in any suitable format) to the operator of the first client device 104-1 (and/or operators of any other client devices that interact with the first external computing device 112-1).

Hence, in particular, at the block 408, it is understood that the first client device 104-1 has interacted with the first external computing device 112-1 to enact a transaction to (for example) purchase one or more of the associated provider objects 210. The first external computing device 112-1 may conduct the transaction in any suitable manner (e.g. requesting credit card information, and/or other payment information, from the first client device 104-1, and/or using credit card information, and/or other payment information associated with the first client device 104-1 that may be on record with the first external computing device 112-1) such that the first client device 104-1 purchases one or more of the associated provider objects 210. While not depicted, it is understood that the one or more computing devices 200 may include a transaction computing device for reconciling transactions and/or transfer of funds, and the like, between the external computing devices 112 and the provider system 102.

Continuing with the example of the one or more associated provider objects 210 representing seats on a given flight, the transaction conducted between the first external computing device 112-1 and the first client device 104-1 may further include collection, from the first client device 104-1, of passenger information that may be required to book a seat on a flight and/or generate a passenger name record, and the like, and which may include, but is not limited to, a full name of a passenger, passport information, frequency flier information, and the like, which may be provided in the indication received at the controller 302 and/or the one more computing devices 200 at the block 408.

While at the block 408 only one provider object 210 is described as being associated with a transaction, it is understood that more than one provider object 210 may be associated with a transaction. Hence, while hereafter, for simplicity, reference is made to only one provider object 210 being associated with a transaction, it is understood that any suitable number of the associated provider objects 210 may be associated with one or more transactions between the first external computing device 112-1 and the first client device 104-1 including, but not limited, a number that indicates that all the associated provider objects 210 are associated with a transaction.

At a block 410, the controller 302 and/or the one more computing devices 200, in response to receiving the indication (e.g. received at the block 408), provides to the first external computing device 112-1, the provider object 210 (e.g. associated with the transaction of the block 408); and reduces, at one or more memories (e.g. the memory 208), a number of the associated provider objects 210.

For example, the provider object 210 (e.g. now in the form of a ticket, and the like, for the given flight) may be provided to the first external computing device 112-1 for distribution to the first client device 104-1. It is hence understood that the first external computing device 112-1 not only conducts the aforementioned transaction, but also distributes provider objects 210 associated with the transaction. The operator of the first external computing device 112-1 may thereafter interact with the provider system 102 using a ticket number provided with the provider object 210, for example to make changes to the provider object 210 and/or check-in to a flight, and the like.

Furthermore, it is understood that the indication received at the controller 302 and/or the one more computing devices 200 at the block 408 indicates that a transaction associated with a provider object 210, of the one or more associated provider objects 210, has occurred at the first external computing device 112-1, and hence a number of available provider 210 indicated at the memory 208 is reduced by a number of the associated provider objects 210 that were indicated as being associated with transaction at the block 408. For example, a number "10" of the associated provider objects 210 may be reduced by "1", to "9" associated provider objects 210. Similarly, the inventory 212 of the provider objects 210 that were made available to distribute via the external computing devices 112 is similarly reduced from "10" to "9" (e.g. and/or reduced by a number of the associated provider objects 210 that were indicated as being associated with transaction at the block 408).

Indeed, the method 400 may further comprise the controller 302 and/or the one more computing devices 200 updating, at one or more memories, such as the memory 208 and/or a memory of the inventory computing device 200-3, remaining provider objects 210, of the one or more associated provider objects 210, based on removal of the provider object 210 from one or more memories.

For example, such updating may be based on one or more of:

A remaining number of the one or more associated provider objects 210. For example, a price of the remaining number of the one or more associated provider objects 210 may be increased or decreased based on the remaining number. In some examples, when the remaining number of the one or more associated provider objects is above a threshold number (e.g. such as one-half of the originally available number of associated provider objects 210, one-third of the originally available number of associated provider, amongst other possibilities), a price of the remaining number of the one or more associated provider objects may be decreased, for example according to a defined amount, such as 10%, 20%, and the like, and/or according to any other suitable amount (e.g. which may be determined using the one or more rules 310 and/or the one or more machine learning algorithms 312). Similarly, when the remaining number of the one or more associated provider objects is below the threshold number, a price of the remaining number of the one or more associated provider objects may be increased, for example according to a defined amount, such as 10%, 20%, and the like, and/or according to any other suitable amount (e.g. which may be determined using the one or more rules 310 and/or the one or more machine learning algorithms 312). However, it is understood that the price may be increased when the remaining number of the one or more associated provider objects is above the threshold number, and the price may be decreased when the remaining number is below the threshold number and/or according to any suitable scheme, which may be determined based on historical patterns of provider object transactions and increases and/or decreased in associated prices.

A rate at which the remaining number of the one or more associated provider objects 210 is decreasing. In some examples, when the remaining number of the one or more associated provider objects is decreasing at a rate above a threshold rate (e.g. 1 per hour, or 2 per day, amongst other possibilities), a price of the remaining number of the one or more associated provider objects may be increased, for example according to a defined amount, such as 10%, 20%, and the like, and/or according to any other suitable amount (e.g. which may be determined using the one or more rules 310 and/or the one or more machine learning algorithms 312). Similarly, when the remaining number of the one or more associated provider objects is increasing at a rate above the threshold rate, a price of the remaining number of the one or more associated provider objects may be decreased, for example according to a defined amount, such as 10%, 20%, and the like, and/or according to any other suitable amount (e.g. which may be determined using the one or more rules 310 and/or the one or more machine learning algorithms 312). However, it is understood that the price may be decreased when the rate is above the threshold rate, and the price may be increased when the rate is below the threshold rate, and/or according to any suitable scheme, which may be determined based on historical patterns of provider object transactions and increases and/or decreased in associated prices.

A total remaining number of provider objects that include the remaining number of the one or more associated provider objects 210, and a respective number of other provider objects that represent other associated items, that, together with the one or more associated provider objects 210, represent an associated provider object inventory of the one or more respective associated items. For example, as described above, the inventory 212 may indicate that "40" provider objects are being made available for distribution using "PULL" distribution mechanisms, however this number may also change over time. As such, rather than base a price of remaining number of the one or more associated provider objects 210 on only the remaining number of the one or more associated provider objects 210 and/or a rate of decrease thereof, a price of the remaining number of the one or more associated provider objects 210 may be based on a total remaining number of provider objects, and such updating may also be threshold based.

A respective rate of decrease of the total remaining number of provider objects, which may also be threshold based and may be similar to updating a price based on a rate at which the remaining number of the one or more associated provider objects 210 is decreasing.

A time difference between a current time and a time associated with the one or more associated provider objects 210, such as the date and time indicated at the interface 204 (e.g. a date and time of the given flight).

In some examples, when the time difference is above a threshold time difference (e.g. 1 day, 2 days, amongst other possibilities), a price of the remaining number of the one or more associated provider objects may be increased, for example according to a defined amount, such as 10%, 20%, and the like, and/or according to any other suitable amount (e.g. which may be determined using the one or more rules 310 and/or the one or more machine learning algorithms 312). Similarly, when the time difference is below the threshold time difference, a price of the remaining number of the one or more associated provider objects may be decreased, for example according to a defined amount, such as 10%, 20%, and the like, and/or according to any other suitable amount (e.g. which may be determined using the one or more rules 310 and/or the one or more machine learning algorithms 312). However, it is understood that the price may be decreased when the time difference above the threshold time difference, and increased when the time difference below the threshold time difference, and/or according to any suitable scheme, which may be determined based on historical patterns of provider object transactions and increases and/or decreased in associated prices.

Furthermore, while the examples above are described with respect to updating prices of the remaining one or more associated provider objects 210, such updating may alternatively, and/or in addition, include updating services associated with the one or more associated provider objects 210. Such updating may include removing or adding or changing services. For examples, as described above, the one or more associated provider objects 210 may be include a checked bag and a booked seat. However, the updating may include removing one or more of the checked bag and the booked seat. Alternatively, the updating may include adding other services, such as a lounge pass, and the like. Such updating may occur according to any suitable scheme and/or may be threshold based and/or may be implemented using the one or more rules 310 and/or the one or more machine learning algorithms 312, and the like.

In some examples, the updating (e.g. of the price and/or services) may occur automatically. However, in other examples the updating may occur upon receipt of approval input, for example via an input device. In particular, an indication of an updated price and/or updated services may be provided at a display screen (e.g. via the interface 204) along with electronic buttons, and the like, to accept or decline the updated price and/or updated services, and approval input, or refusal input, may be received via an input device.

Furthermore, the method 400 may further comprise the controller 302 and/or the one more computing devices 200, in response to receiving the indication (e.g. of the block 408), generating a record 216 of the transaction and the provider object 210.

For example, the distribution computing device 200-2, having received the indication of the block 408, may provide the indication to the order computing device 200-4, which generates a record 216 of the transaction at the memory 214. Indeed, such an example further illustrates that the computing devices 200 may communicate and/or cooperate in any suitable manner to perform functionality as described herein.

Aspects of an example of the method 400 will next be described with respect to FIG. 5 and FIG. 6, which are substantially similar to FIG. 2, with like components having like numbers.

Figure 5:
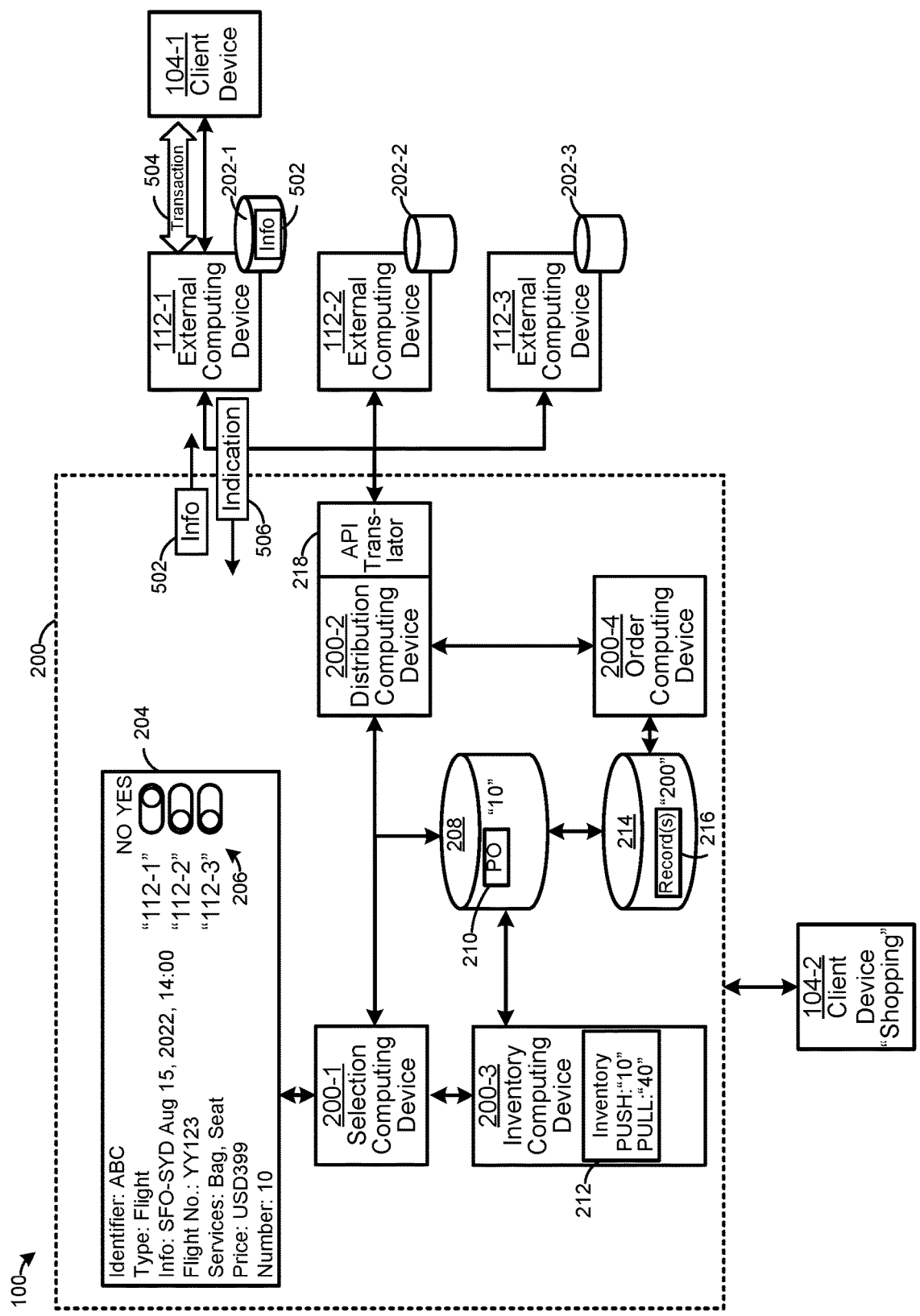
FIG. 5 depicts the system of FIG. 2 implementing aspects of a method for managing inventory of provider objects, according to non-limiting examples.

Attention is first directed to FIG. 5. It is understood in FIG. 5 that the block 402 and the block 404 of the method 400 have already been implemented, and hence the one or more associated provider objects 210 have been generated and stored at the memory 208 in any suitable manner.

It is further understood in FIG. 5, that the first external computing device 112-1 has been selected via the interface 204 and the selection mechanism 206.

As also depicted in FIG. 5, one or more of the computing devices 200 (e.g. the distribution computing device 200-2) pushes (e.g. at the block 406 of the method 400), to the first external computing device 112-1, information 502 identifying the one or more associated provider objects 210, and which may include the information depicted at the interface 204 and/or any other suitable information that describes the one or more associated provider objects 210, including the price (e.g. of USD 399). As depicted, the first external computing device 112-1 stores the information 502 in the respective memory 202-1 such that the first external computing device 112-1 may recall and provide the information 502 to the first client device 104-1, for example in banner information on webpages, and the like, and/or in any other suitable manner.

As also depicted in FIG. 5, a transaction 504 associated with one or more of the associated provider objects 210 occurs between the first external computing device 112-1 and the first client device 104-1, and the first external computing device 112-1 provides an indication 506 of the transaction to the one or more computing devices 200. For example, the indication 506 may be received (e.g. at the block 408 of the method 400) at the distribution computing device 200-2.

Figure 6:
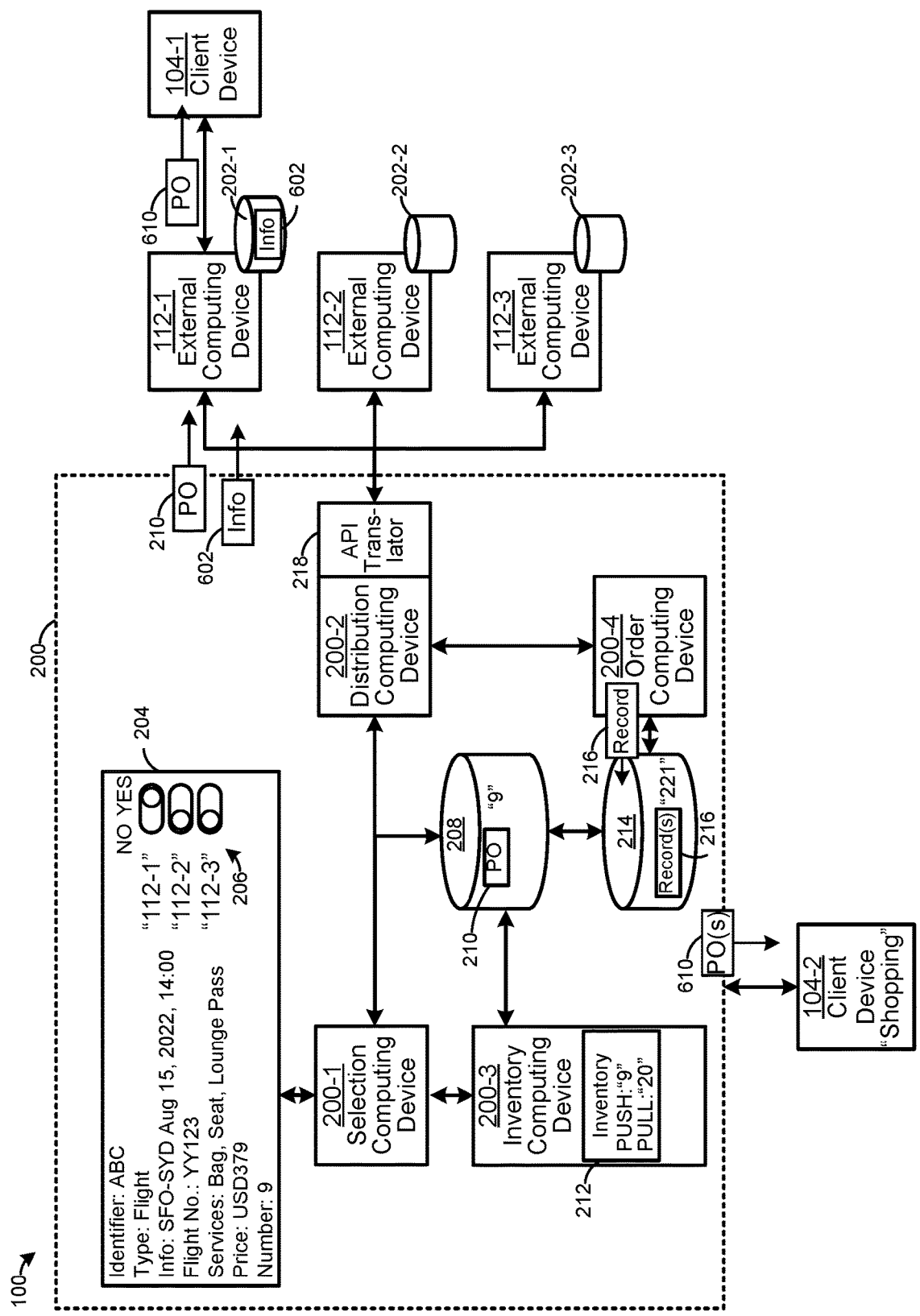
FIG. 6 depicts the system of FIG. 2 implementing further aspects of a method for managing inventory of provider objects, according to non-limiting examples.

Attention is next directed to FIG. 6, which is understood to depict the system 100 after receipt of the indication 506 at the one or more computing devices 200.

As depicted, in response to receiving the indication, the distribution computing device 200-2 provides (e.g. at the block 410 of the method 400) the first external computing device 112-1 with a provider object 210 (e.g. of the one or more associated provider objects 210), and the first external computing device 112-1 provides the provider object 210 to the first client device 104-1.

Furthermore, as depicted, in response to receiving the indication, a number of the associated provider objects 210 has been reduced (e.g. also at the block 410 of the method 400), for example from "10" to "9". Such reduction may be performed by the distribution computing device 200-2, and/or by any other suitable computing device 200.

Similarly, the inventory 212 has been updated to indicate that the number of associated provider objects 210 has been reduced (for example from "10" to "9". Such a reduction may occur via a synchronization process implemented by the inventory computing device 200-3, and/or in any other suitable manner, and/or by any other suitable computing device 200.

Also depicted in FIG. 6, the order computing device 200-4 generates a record 216 of the transaction 504 and stores the record 216 at the memory 214.

As also depicted in FIG. 6, while the method 400 was being implemented, a number of other provider objects 610 (e.g. such as "20" provider objects 610 associated with the same flight as the associated provider objects 210), were distributed via a pull distribution mechanism to the second client device 104-2), and the like, and hence, at the inventory 212, the number of other provider objects (e.g. provider objects 610) available via a "PULL" distribution mechanism has reduced from "40" to "20" (e.g. based on 20 provider objects 610 distributed via a traditional pull distribution mechanism in the time period in which 1 provider object was distributed via the external computing device 112-1). It is understood that records 216 of such transactions are also stored at the memory 214, and hence a number of the records 216 at the memory 214 has increased from "200" to "221" (e.g. "20" provider objects 610 distributed via a pull distribution mechanism, and "1" provider object 210 distributed via the push distribution mechanism of the method 400).

Also depicted in FIG. 6, at the interface 204, the price of the "9" remaining associated provider objects 210 have been updated, for example from 399 USD (e.g. as in FIG. 2 and FIG. 5) to USD 379. Similarly, the services associated with the remaining associated provider objects 210 have been updated, for example to include a "Lounge Pass". Such updating may be based on any of the factors mentioned herein, including, but not limited to, the number of the remaining associated provider objects 210 and/or a rate of decrease thereof, the number of the total remaining inventory 212 (e.g. "29") and/or a respective rate of decrease thereof, a time difference between a current time and the time of the associated flight, and the like.

Also depicted in FIG. 6, one or more of the computing devices 200 (e.g. the distribution computing device 200-2) pushes (e.g. at the block 406 of the method 400), to the first external computing device 112-1, information 502 identifying the remaining associated provider objects 210 as updated, which may also be stored at the memory 202-1 (e.g. replacing the information 602). As such, the first external computing device 112-1 may recall and provide the information 602 to the first client device 104-1, or other client devices, for example in banner information on webpages, and the like, and/or in any other suitable manner. Indeed, the information 602 may be provided to the first external computing device 112-1 even when the remaining associated provider objects 210 are not updated, for example to indicate a remaining number of the associated provider objects 210.

Similarly, in examples where more than one external computing device 112 was selected (e.g. via the selection mechanism 206), the or more of the computing devices 200 (e.g. the distribution computing device 200-2) pushes (e.g. at the block 406 of the method 400), to all the external computing device 112 which were selected, the information 502, and the like, identifying the remaining associated provider objects 210 as updated such that all selected external computing device 112 receive the information.

Indeed, when the remaining number of associated provider objects 210 are reduced to zero, and/or the associated provider objects 210 expire (e.g. a current time is later than an expiry time of the associated provider objects 210), one or more of the computing devices 200 (e.g. the distribution computing device 200-2) may instruct (e.g. via providing suitable information and/or instructions) the first external computing device 112-1 to remove the information 502 and/or the information 602 and/or to no longer provide the information 502 and/or the information 602 to the first client device 104-1 and/or other client devices.

Furthermore, in some examples, a portion of the associated provider objects 210 may also be offered for transactions via pull distribution mechanisms, and a number of the associated provider objects 210 may change accordingly. For example, while as described herein, the inventory 212 distinguishes between associated provider objects 210 being offered via the push distribution mechanism of the method 400 and other provider objects 210 being offered via pull distribution mechanisms, in other examples, all associated provider objects may be offered via all available distribution mechanisms, for example to maximize a chance of associated transactions.

As should by now be apparent, the operations and functions of the devices described herein are sufficiently complex as to require their implementation on a computer system, and cannot be performed, as a practical matter, in the human mind. In particular, computing devices, and the lie, such as set forth herein are understood as requiring and providing speed and accuracy and complexity management that are not obtainable by human mental steps, in addition to the inherently digital nature of such operations (e.g., a human mind cannot interface directly with, RAM or other digital storage, cannot transmit or receive electronic messages, among other features and functions set forth herein).

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein can be achieved using a computing apparatus that has access to a code memory (not shown), which stores computer-readable program code for operation of the computing apparatus. The computer-readable program code could be stored on a computer readable storage medium, which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more examples. The scope, therefore, is only to be limited by the claims appended hereto.

What is claimed is:

1. A method comprising:
generating, via one or more computing devices, one or more associated provider objects representing one or more respective associated items provided by a provider system, the one or more associated provider objects including respective prices for the one or more associated respective items;
storing, via the one or more computing devices, at one or more memories, the one or more associated provider objects;
generating, via the one or more computing devices, at a display screen, an interface, the interface including a selection mechanism to select, or deselect, one or more external computing devices from a plurality of external computing devices;
receiving, via the one or more computing devices an interaction with the selection mechanism to select an external computing device of the plurality of external computing devices, the interaction received via a selection computing device;
selecting, via the one or more computing devices, the external computing device from the plurality of external computing devices as indicated via the interaction with the selection mechanism;
pushing, via the one or more computing devices, to the external computing device as selected via the selection mechanism, information identifying the one or more associated provider objects, the external computing device being external to the provider system and the one or more computing devices, the information identifying the one or more associated provider objects including the respective prices, wherein generating the one or more associated provider objects and pushing the information identifying the one or more associated provider objects to the external computing device both occur in an absence of a request to the one or more computing devices that includes search criteria, from the external computing device, wherein pushing the information identifying the one or more associated provider objects to the external computing device occurs in an absence of both: search criteria and a request, from the external computing device to the one or more computing devices, that includes any search criteria;
deselecting, via the one or more computing devices, one or more other external computing devices from the plurality of external computing devices as indicated via the interaction with the selection mechanism;
refraining, via the one or more computing devices, from pushing to the one or more other external computing devices as deselected via the selection mechanism, the information identifying the one or more associated provider objects;
receiving, at the one or more computing devices, from the external computing device, an indication that a transaction associated with a provider object of the one or more associated provider objects, has occurred; and
in response to receiving the indication:
providing, via the one or more computing devices, to the external computing device, the provider object;
reducing, via the one or more computing devices, at the one or more memories, a number of the associated provider objects;
updating respective information identifying one or more remaining associated provider objects, different from the provider object provided to the external computing device, based on the provider object being provided to the external computing device; and
pushing, via the one or more computing devices, to the external computing device as selected via the selection mechanism, the respective information, as updated, identifying the one or more remaining associated provider objects.

2. The method of claim 1, further comprising, in response to receiving the indication, generating a record of the transaction and the provider object.

3. The method of claim 1, wherein generating the one or more associated provider objects and pushing the information identifying the one or more associated provider objects to the external computing device both occur in an absence of a shopping step at the external computing device and the one or more computing devices.

4. The method of claim 1, further comprising:
updating, via the one or more computing devices, at the one or more memories, remaining provider objects, of the one or more associated provider objects, based on removal of the provider object from the one or more memories.

5. The method of claim 1, wherein the pushing, to the external computing device, the information identifying the one or more associated provider objects occurs via an applications programming interface translator.

6. The method of claim 1, wherein the selecting of the external computing device is further based on one or more of:
one or more given rules;
one or more machine learning algorithms;
one or more locations associated with the one or more associated provider objects; and
one or more respective locations associated with the plurality of external computing devices.

7. The method of claim 1, further comprising updating the one or more associated provider objects based on one or more of:
a remaining number of the one or more associated provider objects;
a rate of decrease of the remaining number of the one or more associated provider objects;
a time difference between a current time and a time associated with the one or more associated provider objects;
a total remaining number of provider objects that include the remaining number of the one or more associated provider objects, and a respective number of other provider objects that represent other associated items, that, together with the one or more associated provider objects, represent an associated provider object inventory of the one or more respective associated items; and
a respective rate of decrease of the total remaining number of provider objects.

8. The method of claim 1, wherein the information identifying the one or more associated provider objects is not pushed to respective external computing devices that are deselected using the selection mechanism.

9. A device comprising:
a communication interface; and
a controller configured to:
- generate one or more associated provider objects representing one or more respective associated items provided by a provider system, the one or more associated provider objects including respective prices for the one or more associated respective items;
- store, at one or more memories, the one or more associated provider objects;
- generate, at a display screen, an interface, the interface including a selection mechanism to select, or deselect, one or more external computing devices from a plurality of external computing devices;
- receive, using an input device, an interaction with the selection mechanism to select an external computing device of the plurality of external computing devices, the interaction received via a selection computing device;
- select the external computing device from the plurality of external computing devices as indicated via the interaction with the selection mechanism;
- push, via the communication interface, to the external computing device as selected via the selection mechanism, information identifying the one or more associated provider objects, the external computing device being external to the provider system and the device, the information identifying the one or more associated provider objects including the respective prices, wherein generating the one or more associated provider objects and pushing the information identifying the one or more associated provider objects to the external computing device both occur in an absence of a request to the one or more computing devices that includes search criteria, from the external computing device, wherein pushing the information identifying the one or more associated provider objects to the external computing device occurs in an absence of both: search criteria and a request, from the external computing device to the one or more computing devices, that includes any search criteria;
- deselect one or more other external computing devices from the plurality of external computing devices as indicated via the interaction with the selection mechanism;
- refrain from pushing to the one or more other external computing devices as deselected via the selection mechanism, the information identifying the one or more associated provider objects;
- receive, via the communication interface, from the external computing device, an indication that a transaction associated with a provider object of the one or more associated provider objects, has occurred; and
- in response to receiving the indication:
  - provide, via the communication interface, to the external computing device, the provider object;
  - reduce at the one or more memories, a number of the associated provider objects;
  - update respective information identifying one or more remaining associated provider objects, different from the provider object provided to the external computing device, based on the provider object being provided to the external computing device; and
  - push, to the external computing device as selected via the selection mechanism, the respective information, as updated, identifying the one or more remaining associated provider objects.

10. The device of claim 9, wherein the controller is further configured to: in response to receiving the indication, generate a record of the transaction and the provider object.

11. The device of claim 9, wherein the controller is further configured to both generate the one or more associated provider objects and push the information identifying the one or more associated provider objects to the external computing device in an absence of a shopping step at the external computing device and the controller.

12. The device of claim 9, wherein the controller is further configured to:
update, at the one or more memories, remaining provider objects, of the one or more associated provider objects, based on removal of the provider object from one or more memories.

13. The device of claim 9, wherein the pushing, to the external computing device, the information identifying the one or more associated provider objects occurs via an applications programming interface translator.

14. The device of claim 9, wherein the controller is further configured to: select the external computing device from the plurality of external computing devices further based on one or more of:
- one or more given rules;
- one or more machine learning algorithms;
- one or more locations associated with the one or more associated provider objects; and
- one or more respective locations associated with the plurality of external computing devices.

15. The device of claim 9, wherein the controller is further configured to update the one or more associated provider objects based on one or more of:
- a remaining number of the one or more associated provider objects;
- a rate of decrease of the remaining number of the one or more associated provider objects;
- a time difference between a current time and a time associated with the one or more associated provider objects;
- a total remaining number of provider objects that include the remaining number of the one or more associated provider objects, and a respective number of other provider objects that represent other associated items, that, together with the one or more associated provider objects, represent an associated provider object inventory of the one or more respective associated items; and
- a respective rate of decrease of the total remaining number of provider objects.

16. The device of claim 9, wherein the information identifying the one or more associated provider objects is not pushed to respective external computing devices that are deselected using the selection mechanism.

* * * * *